United States Patent Office 3,180,969
Patented Apr. 27, 1965

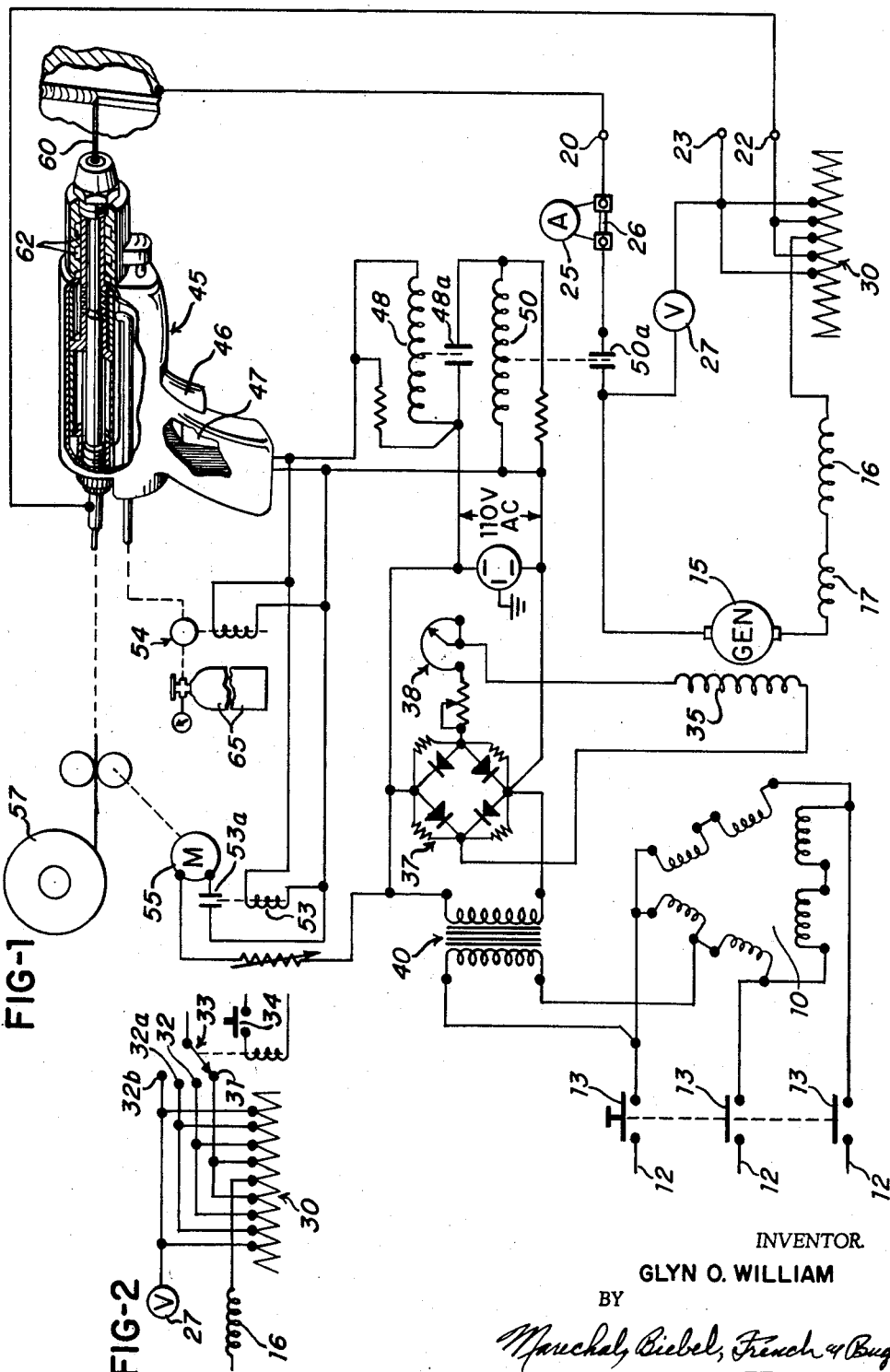

3,180,969
ARC WELDING APPARATUS AND METHOD
Glyn O. Williams, Troy, Ohio, assignor to Hobart Brothers Company, Troy, Ohio, a corporation of Ohio
Filed Mar. 12, 1963, Ser. No. 264,675
6 Claims. (Cl. 219—137)

The present invention relates to improved apparatus for electric arc welding, and to a method of electric arc welding.

Particularly, the present invention is concerned with electric arc welding of a type sometimes known in the art as short circuiting arc welding. A typical process for such welding is disclosed in United States Patent No. 2,886,696. The usual type of apparatus employs a welding head or gun through which a consumable electrode is fed toward the work at a predetermined rate. Usually the feed is automatic, and is closely controlled, as through mechanism incorporating an adjustable constant speed electric motor or the like. A D.C. welding circuit is used, and preferably a gas shield is provided by flooding the area surrounding the arc with a suitable gas.

The welding voltage and current are controlled in the predetermined manner such that as the electrode is fed toward the work it will short circuit and a rather high welding current will flow causing a small amount of the electrode material to pool and deposit in the weld, with the result that the molten metal from the electrode will deposit on the work leaving a gap across which the welding arc will be created. Then, as the electrode continues to move forward it will again contact the pool and short circuit, with the result that the welding process is in effect a series of repetitively struck arcs each extinguished by short circuiting.

Generally the prior art utilizes control of the inductive reactance of the welding circuit to "tune" the circuit during the welding operation in a manner suitable to the various electrode diameters, and in addition the rate of feed of the consumable electrode may be controlled to provide the desired process. In such an arrangement it is necessary to maintain a predetermined inductive reactance in the entire welding circuit, including the field windings of the welding generator where one is used, as well as in the other elements making up the circuit, such as the welding leads themselves. In order to adjust the inductive reactance of such a circuit, it is necessary to incorporate a rather large and expensive adjustable reactance device (of known construction) in the circuit.

The present invention provides a novel and simplified welding apparatus and method, whereby the welding circuit is tuned by adjustment of an electrical resistance. This resistance is incorporated in the welding circuit in series circuit with the welding leads and a D.C. welding generator. The windings of the generator provide a constant and relatively slight inductive reactance which is inherent in all generators of this type, and which has been found to be of suitable value to sustain the welding arc when the normally steady state output voltage of the welding generator tends to become insufficient to maintain the arc during the process, i.e., when an arc exists prior to a short circuiting of the electrode and the work. Thus, this inherent inductance merely provides a known "smoothing" of the output voltage of the circuit.

According to the present invention, the voltage drop (and correspondingly the increase in current) in the welding circuit is controlled by varying the resistance, and for this purpose a resistance is used which has essentially no inductive reactance effect in a D.C. circuit. It is an important feature of the invention that some of this resistance is always maintained in the circuit, such that when the consumable electrode short circuits the flow of electrical current is limited by the resistance to a rise of approximately 600% of the normal welding current, i.e., current at the time an arc exists. This value may be considered as an upper limit, and in normal operation under short circuiting conditions the current flow rises approximately 400% over normal welding current.

Accordingly, a primary object of this invention is to provide the novel electric arc welding apparatus incorporating a D.C. generator for supply of welding current, wherein the inherent reactance of such generator is the only inductive reactance of any consequence in the welding circuit, and wherein a predetermined minimum electrical resistance of a type having substantially no inductive reactance effect is maintained in the welding circuit at all times to limit the rise of welding current under short circuiting conditions.

Another important object of this invention is to provide a novel electric arc welding process in which a consumable electrode is fed to the work at a predetermined rate in order to maintain successive short circuiting conditions, and wherein the resistance of a D.C. welding circuit coupled to such electrode is adjusted to maintain a predetermined voltage drop across such resistance at all times during the cycle of welding operations, thereby to limit the rise in current during short circuit conditions.

In the drawing—

FIG. 1 is a schematic diagram illustrating a typical form of apparatus provided by the invention; and FIG. 2 is a diagram showing a modification of a portion of the apparatus illustrated in FIG. 1.

Referring to the drawing, welding apparatus in accordance with the invention includes a source of constant welding voltage, preferably provided by a motor-generator set which includes the motor unit 10, shown schematically as a three phase motor, and receiving power from the three phase A.C. supply line 12. A suitable contactor 13 is usually provided to control the operation of the motor. This motor drives a D.C. welding generator comprising the armature 15, compound field windings 16 and interpole windings 17. The welding operation is preferably, but not necessarily, accomplished at reverse polarity, hence the ground terminal 20 is the negative terminal, and at least two alternatively used positive terminals are provided, namely the high current terminal 22 and the lower current terminal 23. If desired, more positive terminals can be provided to give a wider range of selective connections, or a switching arrangement can be employed as mentioned hereafter.

The welding circuit also includes an ammeter 25 connected across a shunt 26 to indicate the welding current, and a voltmeter 27 connected as shown to indicate the voltage across the terminal being used.

A resistor 30 is provided in the series circuit made up by the D.C. generator and the terminals. As will be explained, a minimum portion of this resistor, or its equivalent, is at all times maintained in the welding circuit.

This resistor is of a type which has essentially no inductive reactance effect in the D.C. circuit. A suitable resistor for this purpose is a length of Nichrome wire or the like, preferably having a number of taps or connections along its length such that more or less of the resistance can be included in the circuit. Thus, as shown in the drawing if the high terminal 22 is used, that portion of the resistor is included in the circuit. At all times, however, even when the high terminal is used, at least a minimum amount of resistance is included.

In FIG. 2 a modified form of circuit is shown, for remote controlled change of the amount of resistance in the welding circuit. Like reference numerals are applied to identical parts. Four possible positive terminals 31 and 32, 32a and 32b are shown as contacts of a rotary contactor 33 which is in turn under control of a push button switch 34. This switch may be conveniently located for manipulation by the operator, and thus each time switch 34 is closed the contactor will step to its next adjacent contact, in a known manner.

Excitation of the generator 15 is provided in a conventional manner by varying the exciting current through the exciting field windings 35. This winding is shown receiving power from the full-wave bridge rectifier circuit 37 via the welder control rheostat 38, and power for the bridge circuit is supplied through a transformer 40 having its primary winding connected to an appropriate two of the three input lines 12. As understood by those skilled in the art, adjustment of the rheostat 38 will adjust the output voltage of the welding generator, and this voltage will remain essentially constant by reason of its compound winding construction. In most applications the welding voltage is adjusted to approximately twenty-one volts D.C. Other known apparatus for excitation can be used, such as a separate D.C. generator.

For purposes of explanation a typical welding gun is shown connected to the output terminals of the circuit. This gun is of known construction, and is shown generally at 45. The trigger 46 controls a switch 47 in a relay circuit, and this relay in turn has contacts controlling two functions. When the operator closes the switch 47 by depressing the trigger he energizes the relay coil 48, closing its contacts 48a to energize coil 50 of the welding control relay, and thus closing its contacts 50a in the welding circuit, so that the output of the generator is applied to the terminals. Also, this action completes a circuit through the coil 53 of a feed control relay having contacts 53a which then close to complete the power supply to an adjustable constant speed feed motor 55, and completes a circuit to energize and open a gas control solenoid valve 54. The speed control is not shown since it is conventional and forms no part per se of the present invention. Motor 55 is connected to supply a consumable electrode wire from reel 57 and to feed the wire at a preselected rate through the gun 45. The tip of this consumable electrode wire is shown at 60 emerging from the end of the gun. The gun structure also includes a passage 62 opening around the tip of the gun to direct a flow of shielding gas outward around the tip of the wire, to flood the area surrounding the electrode and the work with shielding gas.

This gas is supplied from a cylinder shown schematically at 65. A suitable gas is $CO_2$, or inert gases such as argon or helium, or mixtures thereof, or in some cases mixtures of one of the inert gases with from 1% up to 5% oxygen.

Thus, whenever the operator depresses the trigger 46, having first initiated the flow of shielding gas, he completes the welding circuit and also initiates feed of the electrode wire. The welding process thus initiated involves subsequent cyclical short circuits, and the present invention provides an improvement in such process as well as novel apparatus for its performance.

The consumable electrode wire, for example small wire of 0.035 inch diameter, or 0.045 inch diameter, is fed forward until it contacts the work. This completes a short circuit across the output terminals of the welding generator. The resultant high flow of current, for example in the range of 320 to 480 amperes, causes a molten pool of metal to form at the tip of the electrode, which pool is deposited on the work.

The resistance of the circuit is such, however, that as the electrode is consumed there will be an arc formed between the work and the tip of the electrode. A molten globule forms on the end of the electrode wire, resulting from the heat of the arc. The wire, however, is being fed toward the work at relatively rapid speed, and the globule is thus pushed toward the work and contacts the work. The resistance of the welding circuit, according to the invention, is controlled such that it limits the amount of current flowing through this molten globule, and allows it to deposit quietly, i.e., without bursting or spattering, upon the work. Sufficient resistance is maintained at all times in the welding circuit to prevent the current from rising to such a high value as to create enough heat to explode this molten globule. As will be explained, this value of resistance will change with different sizes of electrode wires.

The amount of resistance in the welding circuit, as will be noted, is thus always maintained at a predetermined minimum. It has been determined that there should be sufficient resistance in the circuit that when the short circuit condition exists, the welding current cannot rise over approximately six times the normal welding current (when an arc exists) for the size of wire being used, and under most conditions the short circuit current will be about four times the normal welding current. It has been established that a short circuit current flow in the range of approximately 300% to 500% above normal welding current is ideal for the dip transfer process.

The only inductive reactance in the D.C. welding circuit is that of the generator windings, in other words that inductive reactance which is inherent in the construction of the generator. Experiments have shown that even with extreme efforts to reduce inductive reactance to a minimum, there is always some inductive reactance, although it has been reduced to approximately 50 microhenries in some exceptional instances. However, with normal materials of construction and normal manufacturing procedures used to construct the compound wound D.C. generators, an inductive reactance in the neighborhood of 100 microhenries, or somewhat greater, generally results.

Inductive reactance of this order is sufficient to assure stable welding conditions with the present process, where cyclical short circuits may occur at rates of from forty to two hundred fifty short circuits per second. By adjusting the series resistance, as shown herein, it is possible to obtain an effective control of the build-up rate of short circuit current that promotes good welding. In the apparatus illustrated the control of resistance is achieved by inserting the electrical lead for the consumable electrode into another high terminal 22 or the low terminal 23, thereby changing the effective amount of resistance in the circuit, or by adjusting the contactor 33 in the modification shown in FIG. 2. As previously mentioned, additional taps or terminals on the resistance element can be supplied if desired, however at all times there is a connection through a minimum part of the resistance.

It has been established that this minimum should be sufficient to provide approximately a three volt drop in potential across the resistance, regardless of the value of the welding current. Thus, in the welding process when the short circuit conditions exist the voltage drop across the output of the generator will be in the neighborhood of three to four volts. When there is an arc, this voltage will be approximately twenty to twenty-one volts. As an example of the welding currents involved, when using electrode wire of 0.035 inch diameter the welding current during normal or arc conditions will be approximately 80 to 120 amperes, and during short circuit conditions this current will increase to approximately three to four times. The minimum resistance maintained in the welding circuit will keep this rise in current within approximately six times, and in most instances the increase will be approximately four times the arc or normal welding current condition.

Similarly with electrode wire of 0.045 inch diameter the currents at arcing will be in the range of approximately 120 to 250 amperes, and again the currents at short circuit will normally be at three to four times those for arc conditions, and within the limit of approximately six times.

While the method and form of apparatus herein described constitutes a preferred embodiment of the invention, it is to be understood that the invention is not limited to this precise method and form of apparatus, and that changes may be made therein without departing from the scope of the invention which is defined in the appended claims.

What is claimed is:

1. In welding apparatus for gas shielded electric arc welding including a supply of consumable electrode, mechanism forming an electric connection to said electrode and arranged to feed the electrode toward a workpiece at a predetermined rate, and means for supplying shielding gas to the area surrounding the workpiece and the end of the electrode across which the arc is struck; the improvement comprising an arc welding circuit including electrical leads adapted for connection to the workpiece and to the electric connection to said consumable electrode respectively, an electrical resistance element of predetermined resistance characteristics including lack of inductive reactance effect in a D.C. circuit and having sufficient resistance to assure that current flow in the welding circuit during short circuiting between the consumable electrode and the workpiece does not exceed approximately six times the current normally flowing in such circuit when an arc exists therebetween, said resistance element being connected to one of said electrical leads, and a D.C. welding generator having output terminals connected to the other of said electrical leads and to said resistance element respectively forming a series circuit therewith in which said resistance element is connected at all times and in which the sole effective inductive reactance is provided by the inherent inductance of the windings of said generator.

2. Apparatus as defined in claim 1 wherein said resistance element is provided with a plurality of taps arranged for selective connection to said one lead, whereby the resistance in the welding circuit is variable, and wherein said taps are arranged such that at least a predetermined minimum portion of said resistance element is included in said circuit at all times.

3. Apparatus as defined in claim 2 wherein said taps are connected to different contacts of a switching contactor having a common movable contact, said one lead being connected to said common contact, and a control remote from said contactor operative to actuate it and thereby change the position of said movable contact to provide selective changing of the amount of resistance in the welding circuit.

4. A method of electric arc welding in which a consumable electrode is supplied toward a workpiece and caused to contact the workpiece periodically to create successive electrical short circuits between the electrode and the workpiece, and wherein a D.C. potential is applied across the electrode and workpiece whereby welding current flows at an increased rate during short circuit conditions and at a lesser rate during conditions where an arc exists between the electrode and the workpiece, the improvement comprising
   (a) controlling the rate of supply of the electrode toward the workpiece, and
   (b) correlating the resistance in the welding circuit to the flow of welding current to maintain the increase of current flow during short circuit conditions within approximately six times the current flow during arcing conditions.

5. The method defined in claim 4 including the additional step of adjusting the resistance in the welding circuit to maintain a predetermined ratio of voltage drop across the resistance according to changes in adjustment of the welding current.

6. The method defined in claim 4 including the additional step of adjusting the resistance in the welding circuit in accordance with the normal welding current required for the size of consumable electrode being used to maintain the welding current during short circuit conditions within three to four times such normal welding current.

References Cited by the Examiner

UNITED STATES PATENTS

| 1,238,406 | 8/17 | Homrighaus | 171—223 X |
| 2,886,696 | 5/59 | Tuthill et al. | 219—137 |

FOREIGN PATENTS 766,915   1/57   Great Britain.

RICHARD M. WOOD, *Primary Examiner.*